United States Patent [19]

Millier

[11] Patent Number: 5,393,364
[45] Date of Patent: Feb. 28, 1995

[54] METHOD AND DEVICE FOR APPLYING A PLURALITY OF THREADS TO A SUPPORT WITH THE AID OF FLEXIBLE TEETH

[75] Inventor: Laurent Millier, Sens, France

[73] Assignee: Compagnie Generale des Etablissements Michelin - Michelin & Cie, Clermont-Ferrand Cedex, France

[21] Appl. No.: 84,187

[22] PCT Filed: Dec. 27, 1991

[86] PCT No.: PCT/FR91/01078
  § 371 Date: Jul. 1, 1993
  § 102(e) Date: Jul. 1, 1993

[87] PCT Pub. No.: WO92/12001
  PCT Pub. Date: Jul. 23, 1992

[30] Foreign Application Priority Data

Jan. 4, 1991 [FR] France ............... 91 00098

[51] Int. Cl.⁶ .................................. B29D 30/38
[52] U.S. Cl. ................... 156/177; 156/117; 156/178; 156/439; 156/440
[58] Field of Search ........... 156/117, 177, 178, 397, 156/436, 437, 439, 440, 179; 152/533, 526, 562

[56] References Cited

U.S. PATENT DOCUMENTS

| | | |
|---|---|---|
| 2,606,133 | 8/1952 | Havens .................... 156/197 X |
| 2,828,795 | 4/1958 | Hartstein .................... 156/440 |
| 3,272,679 | 9/1966 | Hebberling .................... 156/440 |
| 3,954,547 | 5/1976 | Genthner . |
| 4,820,143 | 4/1989 | Eroskey et al. ............... 156/440 X |
| 4,981,542 | 1/1991 | Carrier .................... 156/177 |
| 5,002,621 | 3/1991 | Ikeda . |
| 5,242,520 | 9/1993 | Carrier .................... 156/177 |

FOREIGN PATENT DOCUMENTS

| | | |
|---|---|---|
| 2042859 | 2/1971 | France . |
| 2325497 | 4/1977 | France . |
| 2501126 | 9/1982 | France . |
| 704816 | 12/1979 | U.S.S.R. . |
| 8101151 | 4/1981 | WIPO . |

*Primary Examiner*—Geoffrey L. Knable
*Attorney, Agent, or Firm*—Brumbaugh, Graves, Donohue & Raymond

[57] ABSTRACT

A method and device (1) for causing a plurality of threads (7) to arrive on a support (11) so as to obtain a ply (13) while imparting a nonlinear shape to the threads (7). The threads (7) are caused to arrive with controlled speed on a cylindrical drum (2) in rotation around an axis. The threads (7) are imparted the nonlinear shape by means of teeth (5) which are displaced with respect to others, parallel to the axis of rotation. At least some of these teeth are flexible between a free end in contact with a thread (7) and an anchoring zone. Plies (13) obtained with this method or device, these plies being used for instance in a tire.

14 Claims, 5 Drawing Sheets

METHOD AND DEVICE FOR APPLYING A PLURALITY OF THREADS TO A SUPPORT WITH THE AID OF FLEXIBLE TEETH

BACKGROUND OF THE INVENTION

The present invention relates to devices and methods for applying threads to supports, in particular supports of plastic or rubber, these devices and methods making it possible, for example, to produce reinforcement plies, in particular reinforcement plies for tires. The invention relates, in particular, to methods and devices which make it possible to apply threads to a support while imparting a nonrectilinear shape to them, for instance a sinuous shape.

Devices which make it possible to apply threads to a support while imparting a sinuous shape to them are described, for instance, in the following patents or patent applications: FR 2 042 859, FR 2 325 497, FR 2 501 126, SU 704, 816, WO 81/1151.

These devices have at least one of the following drawbacks:
- complex character of the devices, giving rise to frequent breakdowns or making costly and frequent maintenance necessary;
- a lack of precision in the laying of the threads, so that the plies obtained have a heterogeneous geometry and therefore present physical properties which vary in accordance with their length.

Application EP-A 318 791 describes a device for applying threads to a support using two clamps, a front clamp and a rear clamp as seen in the direction of advance of the support and of the threads, the device comprising means making it possible to open and close the clamps and means for displacing the rear clamp along the direction of advance or along a direction opposite to the direction of advance, as well as means for displacing the threads in transverse directions. The device described in said application EP-A-318 791 makes it possible to lay the threads with great precision, but the speed of laying is relatively slow due to the complex succession of movements of the clamps, which require stops of the support upon transverse movements of the threads before they are applied to the support and upon the application of the threads to the support.

SUMMARY OF THE INVENTION

The object of the invention is to overcome the drawbacks described above.

Accordingly, the method of the invention for applying a plurality of threads to at least one support so as to obtain at least one ply while imparting a nonlinear shape to the threads is characterized by the following features:
(a) each of the threads is fed with a controlled speed onto a cylindrical drum rotating around an axis;
(b) the threads are imparted the nonrectilinear shape by means of teeth which are displaced with respect to each other parallel to the axis of rotation;
(c) at least some of these teeth are flexible between a free end, in contact with a thread, and an anchoring zone;
(d) due to the flexibility of the flexible teeth, the amplitude of displacement of each thread, measured parallel to the axis of rotation, is determined by the ratio between the speed of arrival of this thread and the peripheral speed of the drum;
(e) the support or supports are caused to arrive in contact with the drum and the threads are applied to the support or supports after the threads have been displaced on the drum;
(f) the ply or plies formed by the support or supports and by the threads in contact with said support, are removed from the drum.

The invention also concerns a device for applying a plurality of threads onto at least one support so as to obtain at least one ply, while imparting to the threads a nonrectilinear shape, the device being characterized by the following features:
(a) it comprises a drum having means making it possible to drive the drum in rotation around an axis;
(b) it comprises means making it possible to have the threads arrive, each with a controlled speed, onto the drum;
(c) it comprises teeth and means making it possible to displace these teeth with respect to each other parallel to the axis of rotation, so as to impart the nonrectilinear shape to the threads;
(d) at least some of these teeth are flexible between a free end in contact with a thread and an anchoring zone;
(e) it comprises means making it possible to have the support or supports arrive in contact with the drum and of applying the threads on the support or supports after these threads have been displaced;
(f) it comprises means making it possible to remove from the drum the ply or plies each formed by the support or supports and by the threads in contact with said support.

The invention also relates to the plies obtained by the method or device previously described above, as well as articles incorporating these plies, these articles being, for instance, hoses, membranes, belts, or tires.

The expression "thread" is to be taken in a very broad sense. A thread may be a "single thread" formed, for instance, of one or more filaments. When the single thread is formed of a single filament, it is referred to as a "monofilament" and when the single thread is formed by several filaments, it is referred to as a "multifilament".

A thread may, furthermore, itself be an assembly of single threads. By way of example, such an assembly is called a "twist" when it is formed by several individual threads combined by a single twisting operation, and such an assembly is referred to as a "cable" when it is formed of several threads, at least one of which is a twist, combined by one or more twisting operations.

The invention will be easily understood by means of the nonlimitative examples which follow and the diagrammatic figures relating to these examples.

DESCRIPTION OF PREFERRED EMBODIMENTS

Figure 1:
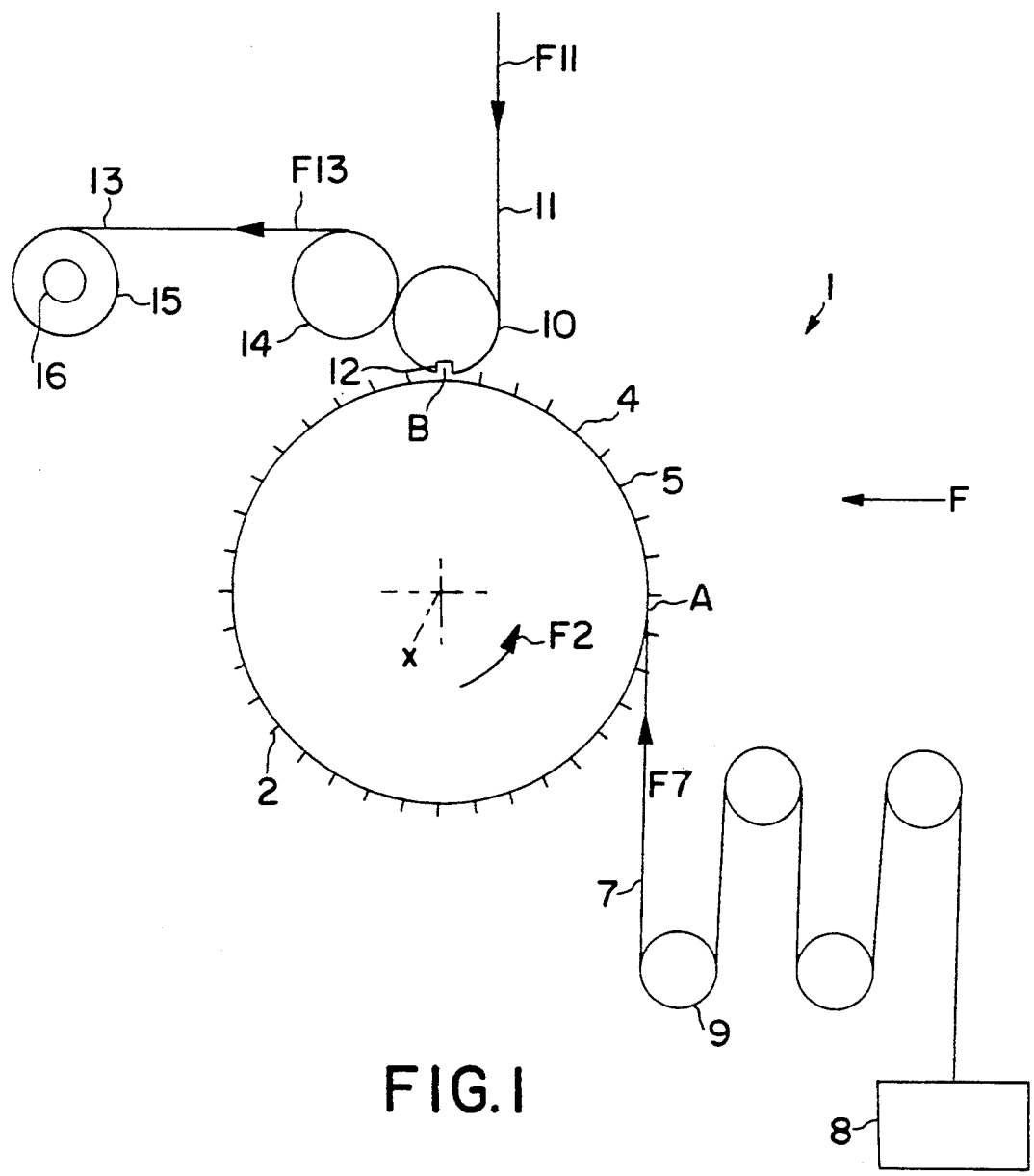
FIG. 1 is a side elevational view in section of a device in accordance with the invention.
Figure 2:
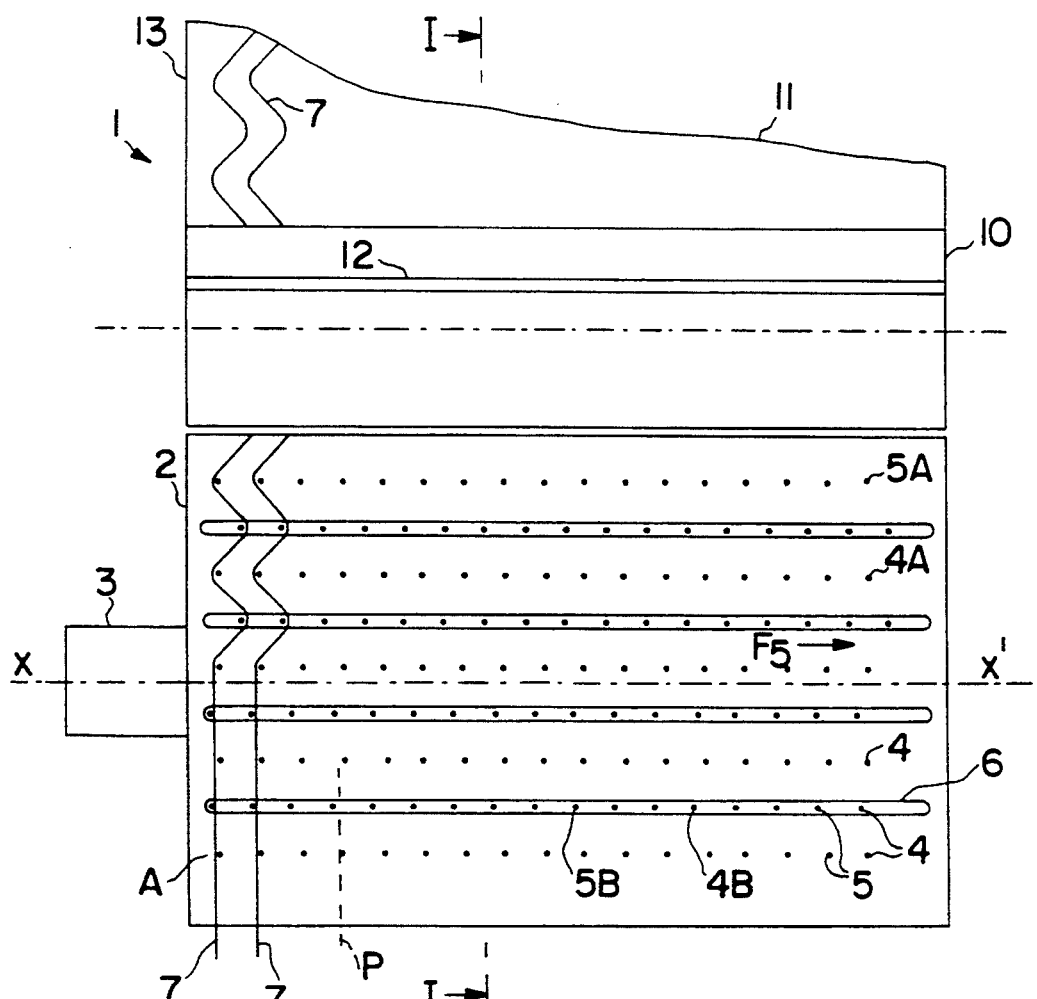
FIG. 2 shows the device shown in FIG. 1 in profile view, in the direction of the arrow F shown in FIG. 1., the section of FIG. 1 being indicated by the lines I—I in FIG. 2.

FIGS. 1 and 2 show a device 1 in accordance with the invention. This device 1 has a drum 2 of generally cylindrical shape and a motor 3 which makes it possible to drive the drum 2 in rotation around the axis xx'. FIG. 1 is a section perpendicular to the axis xx', which is represented by the letter x in said figure, and FIG. 2 is a profile view, seen in the direction of the arrow F in FIG. 1, of the device 1.

The rotation of the drum 2 is diagrammatically indicated by the arrow F2 in FIG. 1. The device 1 comprises rows 4 of teeth 5. Every other row 4, designated 4A, has its teeth 5A fixed, while the other alternate rows, designated 4B, have flexible teeth 5B, the number of flexible teeth 5B of any row 4B being the same for all the rows 4B and equal to the number of fixed teeth 5A of any row 4A, which is also the same for all the rows 4A. The fixed teeth 5A are fastened directly on the drum 2, the rows 4A of these teeth being parallel to the axis xx' and disposed along generatrices of the cylinder 2. The movable teeth 5B are arranged in grooves 6 in the drum 2, one groove 6 for each row 4B, each of these grooves 6 being directed parallel to the axis xx' and along a generatrix of the cylinder 2. The means for the displacement of the movable teeth 5B are not shown in FIGS. 1 and 2, and will be described in greater detail below.

Threads 7 are caused to arrive in contact with the drum 2 and the teeth 5 of the rows 4. For this, the threads 7 come from a feed device comprising, for instance, a creel 8 and a capstan 9. Each of the threads 7 arrives on the drum 2 with a controlled speed. The place where the threads 7 arrive in contact with the drum 2 is indicated by A. At this place A, the fixed teeth 5A and the movable teeth 5B of rows 4A, 4B are disposed substantially in planes P perpendicular to the axis xx', these planes being the same for the fixed teeth 5A and the movable teeth 5B. For purposes of simplification, FIG. 2 shows only two threads 7 and a single plane P (shown in dashed line). As a result of the orientation of the teeth 5 in planes P, each thread 7 contacts the drum 2 substantially parallel to the planes P along a circle of axis xx' between pairs of fixed teeth 5A and between pairs of movable teeth 5B.

Upon the rotation of the drum 2, starting from A, the movable teeth 5B are displaced in the direction of the arrows F5, which causes a deformation of the threads driven by the teeth 5B and these threads 7 are no longer circular on the drum 2 but are given a sinuous shape, the rows 4 being driven in rotation around the axis xx' with the same angular speed as the drum 2.

After their displacement, the threads 7 arrive at the roller 10 which makes it possible to apply the support 11 by calendering to the drum 2. The means for feeding the roller 10 with support 11 are known and are not shown in the drawing for purposes of simplification. The roller 10 has grooves 12 which are directed along the generatrices of the roller 10. The arrangement of the grooves 12 on the roller 10 is such that at the place where the roller 10 applies the support 11 onto the drum 2, the teeth 5A, 5B pass through the support 11 and are disposed in the grooves 12, without touching the roller 10. This place is marked B in FIG. 1. For simplicity in the drawing, the arrival of the support 11 is not shown in FIG. 2 and a single groove 12 is shown in FIGS. 1 and 2.

The ply 13 formed by the support 11 and the sinusoidal threads 7 applied on said support then passes between the roller 10 and an extraction roller 14, and the ply 13 is wound on the spool 15, driven by the motor 16. The axes of the rollers 10, 14 and of the spool 15 are not referenced on the drawing and are parallel to the axis xx'.

The advances of the threads 7, of the support 11 and of the ply 13 are indicated by the arrows F7, F11 and F13, respectively, in FIG. 1.

Figure 3:
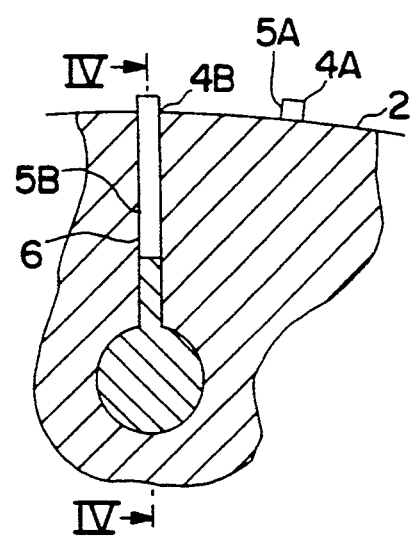
FIG. 3 is a sectional view of a portion of the device shown in FIGS. 1 and 2.
Figure 4A:
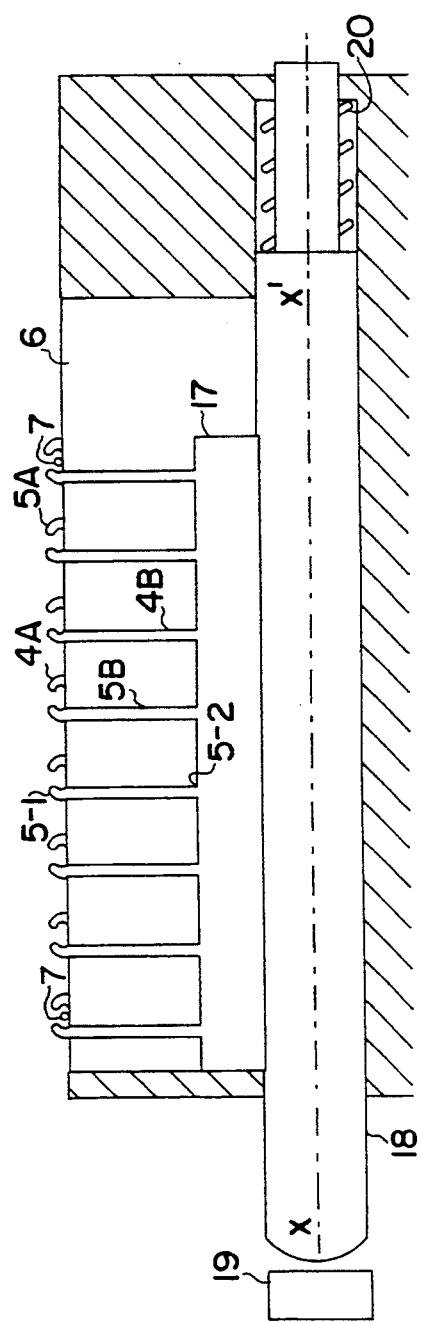
FIG. 4 shows, in partial section, the portion of the device shown in FIG. 3 in the two conditions designated 4A and 4B, the section of FIG. 4 being diagrammatically indicated by the lines IV—IV in FIG. 3.

FIGS. 3 and 4 show the operation of the movable teeth 5B.

FIG. 3 shows a portion of the device 1 comprising a row 4B of movable teeth 5B as well as an adjacent row 4A of fixed teeth 5A and the corresponding portion of the drum 2. The section of FIG. 3 is taken perpendicular to the axis xx', as shown in FIG. 1.

FIG. 4 shows the row 4B corresponding to FIG. 3, FIG. 4 being a partial section along a plane containing the axis xx', the section of FIG. 4 being indicated diagrammatically by the lines IV—IV in FIG. 3. This FIG. 4 represents two conditions, marked 4A and 4B. Each flexible tooth 5B comprises a free end 5-1, intended to come in contact with a thread 7 and an anchoring zone 5-2. All the anchoring zones 5-2 of row 4B are attached rigidly to a part 17, said part 17 and the teeth 5B forming a block of comb shape, formed, for instance, in a single piece by molding a plastic material or by machining a metallic material. The teeth 5B are flexible between their free end 5-1 and their anchoring zone 5-2, the flexing of the teeth 5B taking place substantially along a plane passing through the axis xx' that is to say the plane of FIG. 4 The rows of ends 5-1 and the rows of fixed teeth 5A are disposed substantially along generatrices of the cylinder 2. For simplicity in the drawing, only two threads 7 are shown in FIG. 4.

The part 17 is firmly attached to a bar 18 which can come into contact with a cam 19 due to a return spring 20. For the simplicity of FIG. 4, the part 17, the bar 18, and the teeth 5B have not been shown in section. The part 4A of FIG. 4 represents the position of the row 4B when the cam 19 is not exerting any action on the bar 18. In this case, the teeth 5B have an unbent position, each being substantially in a previously defined plane P containing at least one tooth 5B. The teeth 5B are in this position when they receive the threads 7 at A.

Figure 4B:
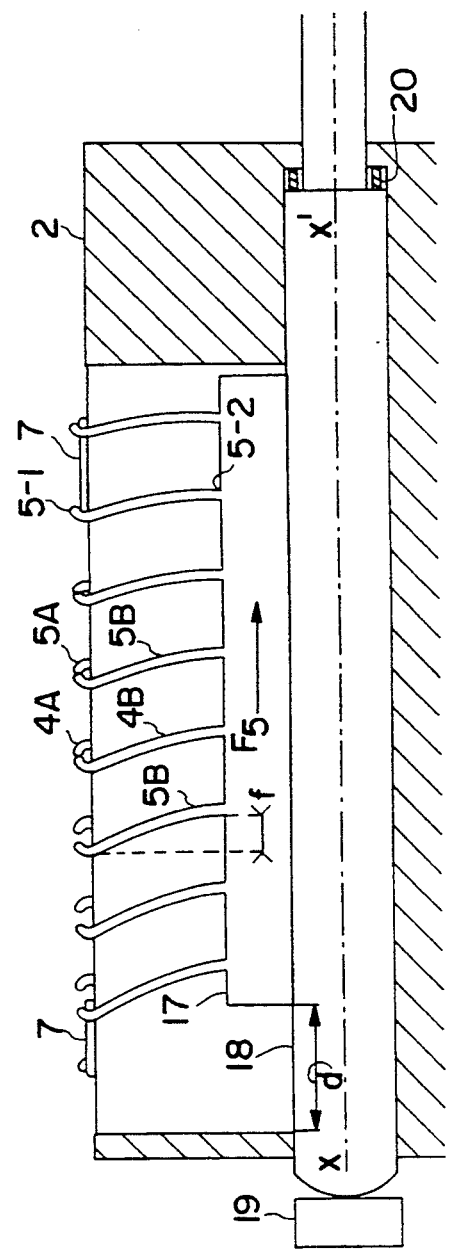

The part 4B of FIG. 4 represents the position of the row 4B when the cam 19 exerts action on the bar 18. In this case, the teeth 5B are displaced in the direction of the arrow F5, parallel to the axis xx', and therefore in the plane of FIG. 4. Furthermore, a flexing of the teeth 5B takes place, the threads 7 limiting the stroke of the free ends 5-1 of the teeth 5B to a value less than the stroke of their anchoring zone 5-2. The stroke of the anchoring zone 5-2 of all the teeth 5B is the same for the entire row 4B, this stroke being marked "d" in FIG. 4B. The bend of each tooth 5B is marked "f", only one of these bends being shown in FIG. 4B. The stroke "c" of the end 5-1 of a tooth 5B, in the direction of the arrow F5 is therefore equal to $d-f$. The teeth 5B assume this position after they have received the threads 7 at A and until the application of the support 11 at B. The arrangement is identical to that which has been described for all the rows 4B of movable teeth 5B.

Figure 5:
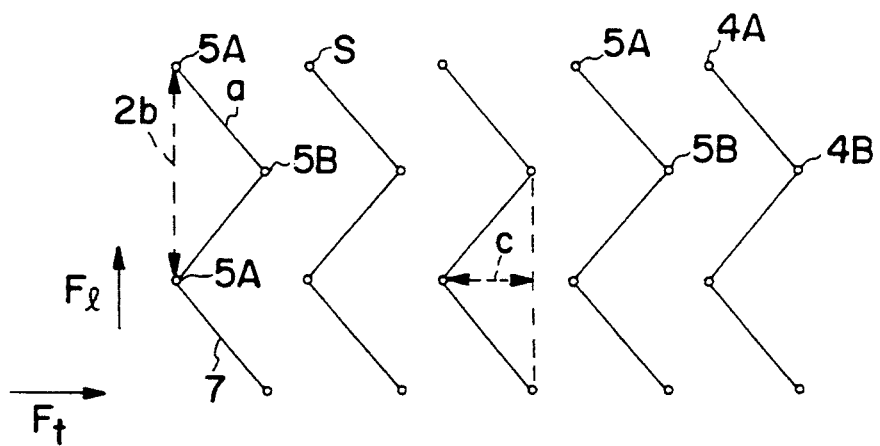
FIGS. 5 and 6 each show an arrangement of the threads on the drum of the device shown in FIGS. 1 and 2.
Figure 6:
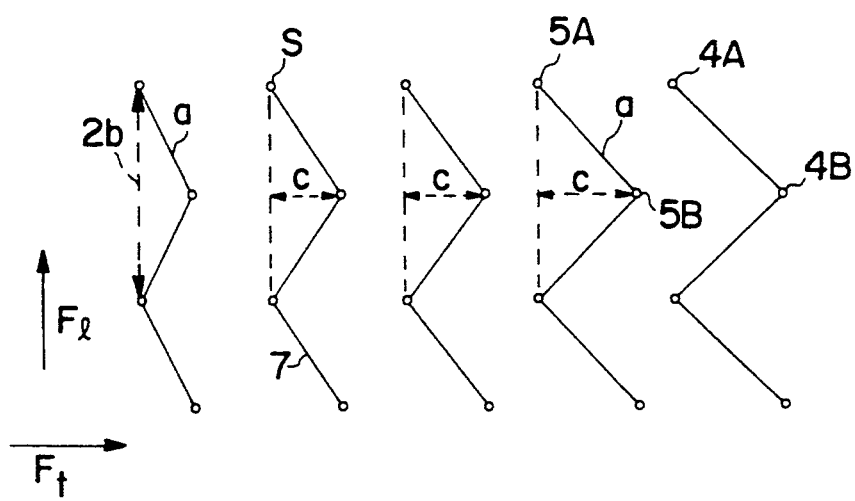

Each of FIGS. 5 and 6 shows a portion of five threads 7 arranged on the drum 2 upon the production of the ply 13, at the place B, that is to say at the time when the support 11 is applied against the threads 7. In FIGS. 5 and 6, the longitudinal direction, that is to say the average direction of the threads 7, corresponding to circles of the drum 2 of axis xx', is represented by F1 and the transverse direction, corresponding to the generatrices of the drum 2, is represented by the arrow Ft.

The threads 7 of FIGS. 5 and 6 all have a sinuous shape, for example a periodic sinuous shape. By definition, the ratio T of a thread 7 is the ratio between, on the one hand, the length of a portion of thread brought to a linear position and, on the other hand, the linear distance between the ends of said portion when the thread has a sinuous shape. In FIGS. 5 and 6 each thread 7 has substantially rectilinear sections between two successive teeth 5A, 5B in contact with said thread. In these FIGS. 5 and 6, the length of thread 7 between one tooth 5A and a following tooth 5B is represented by "a" and the distance between two successive teeth 5A is represented by "2b", "b" representing the distance between two successive rows 4A, 4B, this distance being, for instance, constant over the entire periphery of the drum 2. In this case, one therefore has T=a/b. The invention applies to the case that the threads 7 have sinuous shapes which do not have a linear segment, T having always the same definition. For any given thread 7, T is equal to the ratio between the speed with which this thread 7 arrives on the drum 2 and the peripheral speed of rotation of the drum 2, the thread 7 being assumed nonstretchable.

In FIG. 5, the strokes "c" of the free ends 5-1 are all identical, since the threads 7 have all been introduced onto the drum 2 with the same speed, the ratio T is then the same for all the threads 7.

In FIG. 6, the strokes "c" of the free ends 5-1 are different from one thread to the other since these threads 7 have all been introduced onto the drum 2 with different speeds. The ratio T, therefore, varies from one thread 7 to the other. FIG. 4B corresponds to such an embodiment, the bend f varying from one thread 7 to the other.

On the finished ply 13, the threads 7 retain substantially the arrangement which they had just before the withdrawal of the teeth 5 due to the rotation of the drum 2, that is to say the peaks S of the sinuous paths of the threads 7 correspond substantially to the previous position of the teeth 5A, 5B (FIGS. 5 and 6).

It is necessary to control the speed with which the threads 7 are delivered onto the drum 2. This control can be effected, for instance, by two methods. In a first method, a single capstan 9 is used, each roll of the capstan having as many rollers as there are different speeds for the threads 7. In order to modify the law of variation of the speeds of the threads 7, it is sufficient to modify the stacking of the rollers on the fluted shafts of the drums. These fluted shafts and the drum 2 are driven, for instance, by a single motor with a kinematic chain without slippage using, for instance, gears, chains or notched belts. One thus mechanically assures the ratio of the speeds between the threads 7 and the drum 2.

In a second method, as many capstans 9 are used as there are different speeds, the speed varying therefore from one capstan to the next, these capstans being driven separately with, for each of them, control of the speed as a function of the peripheral speed of the drum. This latter method is at present more expensive that the preceding one, but it results in greater flexibility.

The two methods mentioned above are known and they have not been shown on the drawing for purposes of simplification.

It is possible to vary the speed for the groups of threads, rather than thread to thread, in order to simplify the development, that is to say, in the first method, each roller then corresponds to a group of threads having the same speed of introduction onto the drum 2 and, in the second method, each capstan corresponds to such a group of threads. In this case, it may be advantageous to have, in each row 4B, a single forked tooth 5B per group of threads, said tooth having as many free ends 5-1 as there are threads 7 per group.

The invention provides the following advantages:

One operates continuously, without stopping the rotation of the drum 2, which makes it possible to have high speeds which can, for instance, reach or exceed 5 meters/min.

A ply 13 is obtained, the threads 7 of which are disposed with great uniformity on the support 11. The ratio T of a thread 7 is determined, as previously mentioned, by the ratio between the speed of arrival of this thread 7 on the drum 2 and the peripheral speed of said drum. As it is possible to impose desired values for this ratio, the ratio T can be controlled with great precision. The fluctuation of the ratio T of each thread is, for instance, 0.5%, plus or minus with respect to any nominal value $T_n$, selected for this thread.

The nominal ratio $T_n$ may vary within wide limits from one thread 7 to the other of the ply 13; this ratio which is greater than 1 can, for instance, go up to 3.

Due to the great precision of the ratios T for the ply 13, the latter is characterized by well-defined mechanical properties in the article in which it is incorporated, for instance a tire, even if said article undergoes shaping upon its manufacture.

The variation in the ratio $T_n$ is very easy to obtain; this ratio can therefore be rapidly changed upon manufacture so as to have a variation of $T_n$ not only in the transverse direction, that is to say parallel to the axis xx', but also in the longitudinal direction, for instance upon adjustments of the device, that is to say in the direction of passage of the thread 7 and of the support 11.

Figure 7:
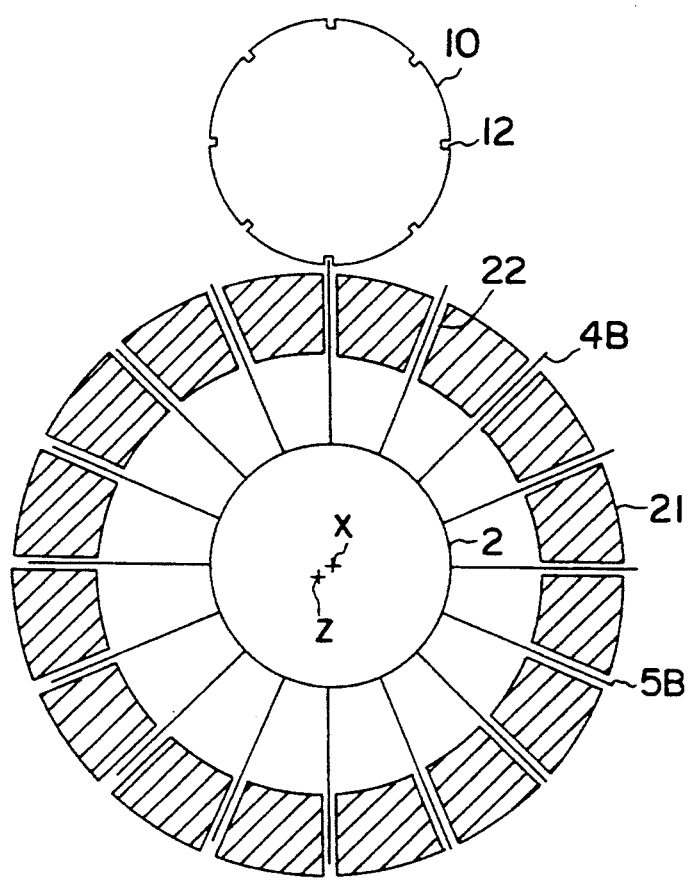
FIG. 7 shows, in section, a portion of another device in accordance with the invention.

In general, the threads 7 adhere sufficiently to the support 11 in order to separate themselves spontaneously from the teeth 5 at the place B. However, it may be useful to make the fixed teeth 5A and the movable teeth 5B retractable, for instance with an eccentric system such as shown in FIG. 7. A hollow eccentric 21 surrounds the drum 2, its diameter being smaller than that of the eccentric 21. This eccentric turns around its axis, represented by z in FIG. 7, while the drum 2 turns around its axis xx', represented by x, different from z, FIG. 7 being a section perpendicular to the axes x, z, which are parallel. The eccentric 21 and the drum 2 turn on their axes with the same angular velocity. The fixed or movable teeth 5 protrude extensively from the drum 2 and can pass through the eccentric 21 due to cuts 22 machined in the latter, parallel to the axes x, z. By properly arranging the axis z, the result can be obtained that the teeth 5 end up by retracting into the cuts 22 precisely at the place where the support 11 is applied to the threads 7, that is to say at the place B. This makes it possible to free the threads 7, which therefore do not run the risk of remaining hooked on the teeth 5.

Furthermore, in the embodiment previously described, the passage of the threads in sinuous position was obtained by the action of a cam, which caused the compression of a spring. In another possible embodiment, this passage can be effected by termination of the action of a cam, causing the relaxation of a spring.

The ply 13 can be used as reinforcement in articles such as hoses, membranes, belts and tires.

It is possible to do away with the sinusoidal shape of the threads 7 upon the shaping of the article in which the ply 13 is used, as described in the aforementioned application EP-A 318 791, or else this sinuous shape can remain, in whole or in part, in the finished article.

The threads 7 are preferably textile threads, the diameter of which varies from 0.2 to 4 mm.

The invention also covers cases in which the decrease in the nominal ratio $T_n$ is reversible, for instance in the case of a membrane formed by a ply in accordance with the invention the support of which is elastic, the deformation of this membrane, under the effect, for instance, of the pressure of a fluid, causing a decrease in said ratio, but the threads resume their initial ratio $T_n$ when the membrane resumes its initial shape. This membrane, made for instance of vulcanized rubber, can serve, in particular, for the making, shaping or vulcanizing of tires.

Of course, the invention is not limited to the embodiments described above.

Thus, in the example previously described, the flexible teeth 5B are those whose anchoring zones 5-2 are displaced, but one can contemplate cases in which these anchoring zones are fixed while rigid teeth are displaced. Cases in which all the teeth are flexible can also be contemplated.

It can also be contemplated that all the teeth, whether rigid or flexible, have driven anchoring zones, for instance some in one direction and the others in the other direction.

I claim:

1. A method of applying a plurality of threads to at least one support in such a manner as to obtain at least one ply, imparting a nonrectilinear shape to the threads, comprising:
   (a) feeding each of the threads with a controlled speed onto a cylindrical drum rotating around an axis;
   (b) imparting the nonrectilinear shape to the threads by means of teeth disposed in rows substantially along generatrices of the drum, some of which rows of teeth are displaced parallel to the axis of rotation with respect to other rows, at least some of these teeth having a flexible free end engageable with a thread;
   (c) determining, due to the flexibility of the flexible teeth, the amplitude of displacement of each thread, measured parallel to the axis of rotation, by controlling the ratio between the speed of arrival of said thread and the peripheral speed of the drum;
   (d) bringing the support or supports in contact with the drum and applying the threads to the support or supports after the threads have been displaced on the drum; and
   (e) removing the ply or plies formed by the support or supports and by the threads in contact with said support from the drum.

2. A method according to claim 1, in which the free ends of the flexible teeth are disposed along rows parallel to the axis of rotation of the drum, and in which the drum has rows of fixed teeth parallel to the axis of rotation of the drum, the number of teeth being the same from one row to the next, the rows being alternately rows of fixed teeth and rows of flexible teeth, the rows of fixed teeth and the free ends of the teeth of the rows of flexible teeth being disposed substantially along generatrices of the cylinder of the drum.

3. A method according to claim 2, in which the threads are fed in contact with the drum at a place where corresponding of the fixed and flexible teeth are disposed substantially in planes perpendicular to the axis of rotation of the drum, these planes being the same for the fixed teeth and the flexible teeth, the threads being disposed parallel to said planes between pairs of fixed teeth and pairs of flexible teeth.

4. A method according to claim 1, in which the threads are imparted a sinuous shape on the drum and the support or supports are caused to arrive in contact with the drum at a place where the threads have acquired substantially their final sinuous shape on the drum.

5. A method according to claim 4, in which the sinuous shape is periodic.

6. A method according to claim 1, in which the threads are caused to arrive on the drum with the same speed for all the threads.

7. A method according to claim 1, in which the threads are caused to arrive on the drum with different speeds for different threads or groups of threads.

8. A device for applying a plurality of threads to at least one support so as to obtain at least one ply, while imparting a nonrectilinear shape to the threads, the device comprising:
   (a) a drum with means making it possible to drive the drum in rotation around an axis;
   (b) means making it possible to have each of the threads arrive with a controlled speed onto the drum;
   (c) teeth disposed in rows substantially along generatrices of the drum and means which make it possible to displace parallel to the axis of rotation at least some of these rows of teeth with respect to other rows, so as to impart the nonrectilinear shape to the threads;
   (d) at least some of these teeth having a flexible free end engageable with a thread the amplitude of the displacement of each thread being determined, due to the flexibility of the teeth, by the ratio between the speed of arrival of said thread and the peripheral speed of the drum;
   (e) means which make it possible to have the support or supports come into contact with the drum and to apply the threads to the support or supports after said threads have been displaced; and
   (f) means making it possible to remove from the drum the ply or plies formed by the support or supports and by the threads in contact with said support.

9. A device according to claim 8, in which the free ends of the flexible teeth are disposed along rows parallel to the axis of rotation of the drum, and in which the drum comprises rows of fixed teeth parallel to the axis of rotation of the drum, the number of teeth being the same from one row to the next, the rows being alternately rows of fixed teeth and rows of flexible teeth, the rows of fixed teeth and the free ends of the teeth of the rows of flexible teeth being disposed substantially along generatrices of the cylinder of the drum.

10. A device according to claim 9, in which the means making it possible to have the threads arrive on the drum are so arranged that they make it possible to have the threads arrive in contact with the drum at a place where corresponding of the fixed and flexible teeth are disposed substantially in planes perpendicular to the axis of rotation of the drum, these planes being the same for the fixed teeth and the flexible teeth, the threads being disposed parallel to said planes, between pairs of fixed teeth and pairs of flexible teeth.

11. A device according to claim 9, in which the fixed and flexible teeth are so arranged as to impart the threads a sinuous shape on the drum and in which the means making it possible to have the support or supports arrive in contact with the drum and to apply the threads to the support or supports are so arranged that the support or supports arrive in contact with the drum at a place where the threads have acquired substantially their final sinuous shape on the drum.

12. A device according to claim 11, in which the sinuous shape is periodic.

13. A device according to claim 8, in which the means which make it possible to have the threads arrive on the drum are so arranged that all the threads have the same speed upon their arrival on the drum.

14. A device according to claim 8, in which the means which make it possible to have the threads arrive on the drum are so arranged that the threads, or groups of threads, have different speeds upon their arrival on the drum.

* * * * *